United States Patent [19]

Spofford, Jr. et al.

[11] 4,418,339
[45] Nov. 29, 1983

[54] TEMPERATURE SENSING CIRCUIT FOR SEMICONDUCTOR JUNCTION TEMPERATURE PROBE

[75] Inventors: Walter R. Spofford, Jr., Bedford; Daniel I. Pomerantz, Lexington, both of Mass.

[73] Assignee: Emhart Industries, Inc., Indianapolis, Ind.

[21] Appl. No.: 157,477

[22] Filed: Jun. 9, 1980

[51] Int. Cl.$^3$ .................... G08B 17/06; G01K 7/02
[52] U.S. Cl. ........................ 340/595; 340/870.17; 374/183; 374/178
[58] Field of Search ............... 340/870.17, 584, 595, 340/596, 870.38, 870.21; 307/310; 73/359 R, 359 A, 360, 362 R, 362 AR, 362 SC; 236/78 R; 374/114, 173, 183, 178

[56] References Cited

U.S. PATENT DOCUMENTS

| | | | |
|---|---|---|---|
| 3,237,156 | 2/1966 | Irvine | 73/362 SC |
| 3,494,196 | 2/1970 | Moussette | 73/362 AR |
| 3,671,953 | 6/1972 | Goldberg | 340/595 |
| 3,684,172 | 8/1972 | Evalds | 73/359 R |
| 3,882,725 | 5/1975 | Rao et al. | 73/362 AR |
| 4,060,715 | 11/1977 | Scott | 364/557 |
| 4,106,341 | 8/1978 | Serrano | 73/362 AR |
| 4,148,220 | 4/1979 | Spofford | 73/362 AR |
| 4,179,745 | 12/1979 | Wuertele | 73/359 R |
| 4,215,336 | 7/1980 | Smith | 73/362 AR |

Primary Examiner—James J. Groody
Attorney, Agent, or Firm—R. F. Meyer; D. W. Gomes

[57] ABSTRACT

The temperature probe is biased for causing current flowing therethrough to be proportional to the probe temperature. A variable set point temperature is represented by a variable reference current which is summed with the temperature probe current. An output signal is produced therefrom to indicate the relationship between the set point temperature and the probe temperature.

3 Claims, 4 Drawing Figures

TEMPERATURE SENSING CIRCUIT FOR SEMICONDUCTOR JUNCTION TEMPERATURE PROBE

BACKGROUND OF THE INVENTION

1. Field of the Invention

The present invention generally relates to temperature sensing circuits and, in particular, relates to such circuits as used with semiconductor junction temperature probes.

2. Statement of the Prior Art

Electrical temperature probes and the electrical sensing circuitry for the operation thereof have been well known and widely used. One of the applications of these probes is microwave ovens. In microwave ovens, the cooking is done very quickly requiring careful control of the cooking cycle. Achievement of this control is attempted by inserting a temperature probe into the food or item being heated and shutting off the oven when the desired temperature is reached. This operation requires a temperature probe having a quick temperature response and a high degree of accuracy over a wide range of normal cooking temperatures.

The most common form of electrical temperature probe or element used is the thermistor, the resistance of which is dependent upon its temperature. Unfortunately, thermistors suffer from the limitation that the resistance response thereof is exponential with respect to the probe temperature. This presents certain sensing circuitry requirements and/or limits to the usefulness of the thermistor in sensing and measuring temperatures beyond limited temperature ranges. Various circuitry which has been developed for the purpose of expanding the usefulness of thermistor temperature sensors are shown and described in U.S. Pat. Nos. 3,882,725; 4,060,715; and 4,106,341. The circuitry described in these patents is capable of linearizing the response of the thermistor temperature sensor, but only at the cost of additional circuitry complexity.

Another form of temperature probe or element, which was developed more recently than the thermistor, but which is also widely used, is the semiconductor junction temperature sensor. This sensor comprises a simple bipolar semiconductor junction, the electrical characteristics of which vary according to the temperature thereof. Two examples of the use of such sensors are U.S. Pat. Nos. 3,808,469 and 3,604,957. The U.S. Pat. No. 3,808,469 patent discloses means for changing the temperature coefficient of the sensor from a negative coefficient to a positive coefficient by the inclusion of a number of positive temperature coefficient elements in the circuit. The U.S. Pat. No. 3,604,957 patent discloses a voltage balancing circuit which compares the temperature of the sensing probe with the temperature of a reference probe. Unfortunately, this circuit is not adapted for allowing variation of the reference temperature.

SUMMARY OF THE INVENTION

Accordingly, a temperature sensing circuit constructed according to the present invention for a semiconductor junction temperature probe comprises means for biasing the probe for causing the current flowing through the probe to be proportional to the temperature of the probe, means for providing a selectively variable reference current representing a selectively variable set point temperature, said reference current being linearly variable with respect to selectable set point temperatures, a current summation junction adapted to be coupled to the probe and to the means for providing the reference current for comparing the reference current to the current flowing through the probe, and means for producing an output signal in response to the relationship between the reference current and the current flowing through the probe to indicate the relationship between the set point temperature and the temperature of the probe. It is another feature of the present invention to provide a rotatable dial for use in selecting a set point temperature, which rotatable dial includes a linear temperature scale. It is another feature of the present invention that the means for producing an output signal include a current to voltage converter having an operational amplifier. It is yet another feature of the present invention that a voltage comparator be connected to the output of the current to voltage converter for comparing the output of the converter to a reference signal in providing indication when the probe temperature equals the set point temperature.

BRIEF DESCRIPTION OF THE DRAWINGS

The present invention is illustratively shown and described in reference to the appended drawings in which.

DETAILED DESCRIPTION OF THE DRAWINGS

Figure 1:
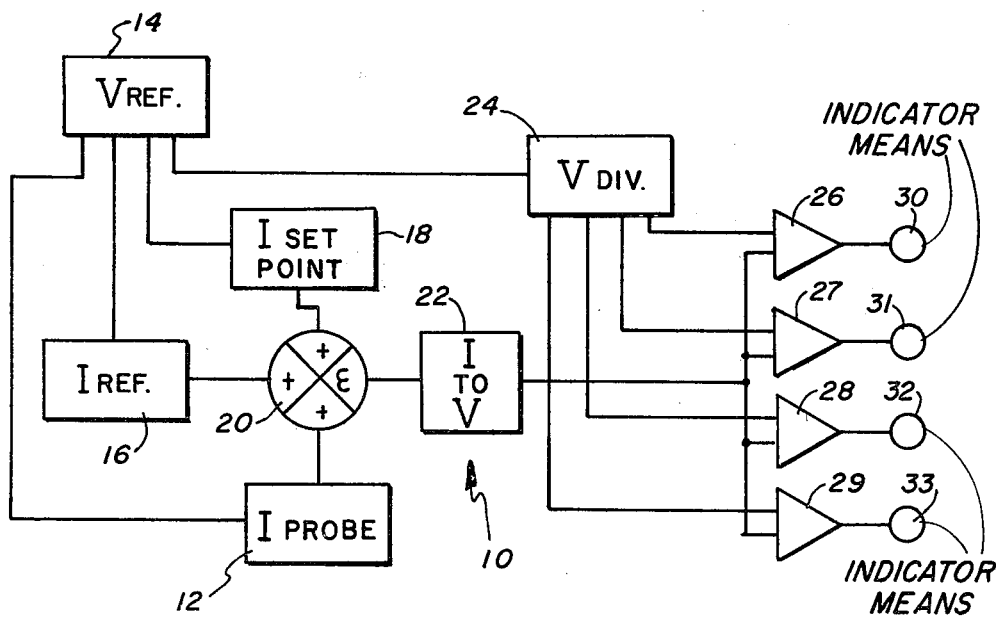
FIG. 1 is a block diagram of the functions performed by one embodiment of the present invention.

In reference to the block diagram of FIG. 1, a temperature sensing circuit 10 is shown for connection to a semiconductor junction temperature probe 12. The circuit 10 generally includes a reference voltage generating circuit means 14, circuit means 16 for determining a constant reference current, circuit means 18 for determining a set point reference current corresponding to a selectable set point temperature, current summation junction 20, a current to voltage converter 22, a plurality of voltage dividers 24, a plurality of voltage comparator circuits 26 through 29 and a plurality of indicator means 30 through 33.

More specifically, the reference voltage generating circuit means 14 generally includes a power supply for converting whatever supply voltage is available, such as 110 VAC, to a useable voltage for the circuit, and various voltage determining means such as zener diodes for fixing a predetermined voltage $V_{REF}$ with a high degree of accuracy. With this highly accurate predetermined voltage $V_{REF}$, the circuit means 16 and 18 generate reference current levels for the operation of the circuit. The current reference circuit means 16 determines a constant reference current $I_{REF}$, and the current reference circuit means 18 determines a variable reference current $I_{SP}$. The variable reference current $I_{SP}$ is determined by an input means (not shown) which represents a selectable set point temperature. Thusly, a set point temperature may be selected and inputted to determine the reference current from the reference current circuit means 18. The reference voltage circuit means 14 is also used to bias the temperature probe 12. The currents from circuit means 16 and 18 are connected to the current summation junction 20 along with the probe 12, where the currents from each of the three devices is summed. The resulting current is representative of the relationship between the selected set point temperature inputted at the reference circuit means 18 and the temperature of the probe as indicated by the current flowing therefrom. The resulting current is coupled to the current to voltage converter 22 where it is converted into a voltage signal also representative of the relationship between the set point temperature and the temperature of the probe 12.

The voltage output of the converter 22 is connected to an input of each of the voltage comparators 26 through 29. The reference voltage circuit means 14 includes a connection to the voltage dividers 24. The dividers 24 set up a plurality of reference voltages for connection to the other inputs of the voltage comparators 26 through 29. The reference voltages set up by the voltage dividers 24 are at different voltage levels and are determined to represent a probe temperature equal to and at different levels below the set point temperature $T_{SP}$.

In the operation of this circuit, the voltage from the converter 22 changes levels as the temperature of the probe 12 rises. As the temperature rises and passes a point which is three temperature intervals below the set point temperature, a comparator such as 29 generates an output signal which triggers indicator means 33 to signal the fact that the probe temperature is three temperature intervals below the set point temperature. For example, if a temperature interval equals 10°, the indicator 33 would tell the operator that the probe temperature, or the temperature of the item in which the probe is located is 30° below the set point temperature. As the probe temperature continues to rise and reaches 20° below the set point temperature, the combination of the voltage output of the converter 22 and the voltage from the dividers 24 causes another comparator, such as 28 to generate a signal and energize indicator means 32 for signalling the operator that the probe temperature is 20° below the set point temperature. As the probe temperature contiues to rise and reaches 10° below the set point temperature, the voltage output of converter 22 and the voltage dividers 24 causes another voltage comparator, such as 27, to energize its indicator means 31 to indicate that the 10° below set point temperature level has been reached. When the probe temperature reaches the set point temperature $T_{SP}$, the remaining voltage comparator 26 is caused to energize its indicator means 30 signalling the operator that the probe temperature is equal to the set point temperature. Thusly, when the present system is used with any sort of heating means such as an oven, or more specifically a microwave oven, the operator is given an indication of how much heating remains in order to properly cook the food or items being heated.

Figure 2:
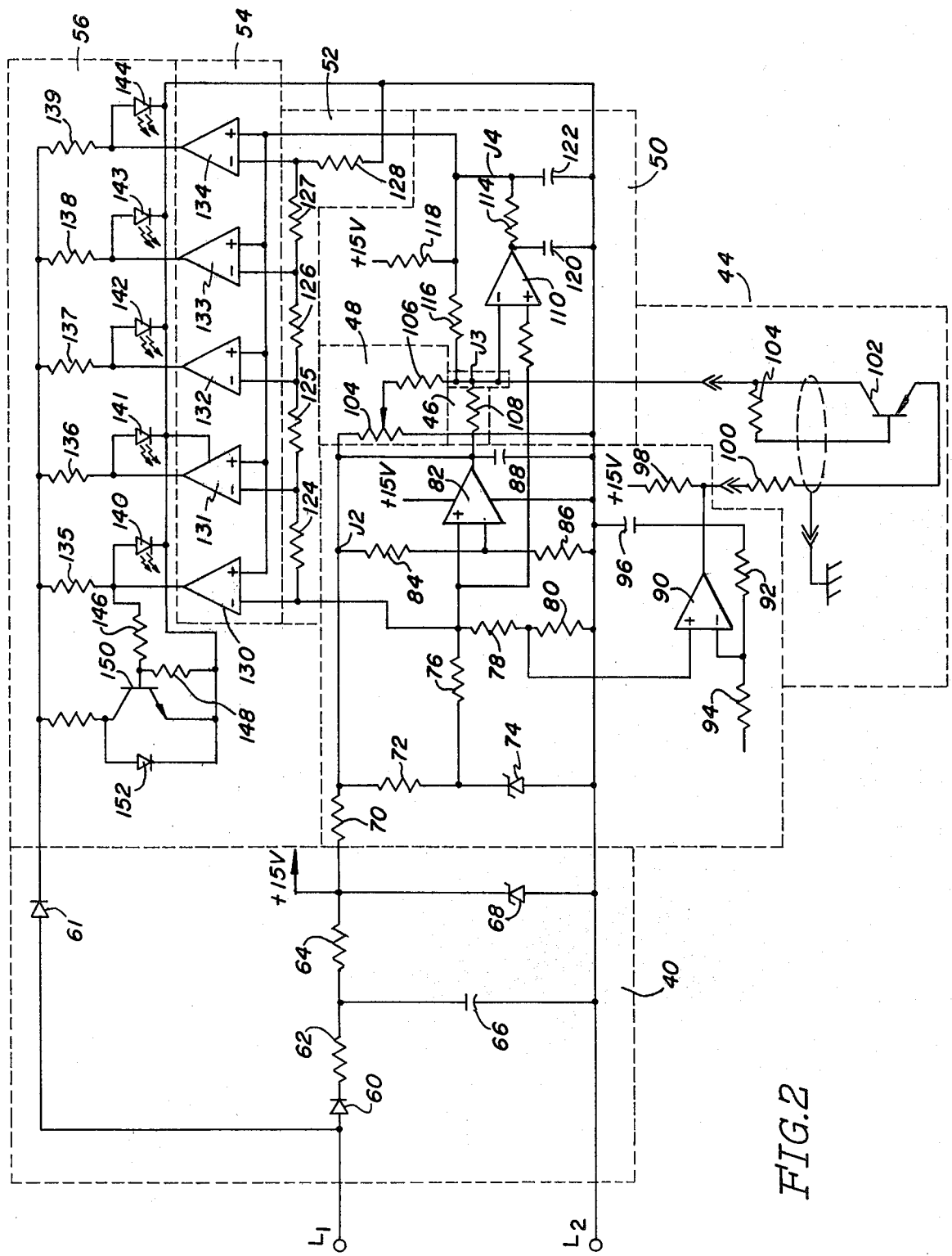
FIG. 2 is a schematic diagram of a temperature sensing circuit constructed in accordance to the present invention and in accordance with the block diagram of FIG. 1.

FIG. 2 shows a circuit representing one embodiment of the present invention which circuit includes the functions described in reference to FIG. 1. Generally, the circuit of FIG. 2 includes a power supply section 40, a reference voltage section 42, a probe section 44, a constant reference current section 46, a variable reference current section 48, a current to voltage converter 50, a voltage divider section 52, a voltage comparator section 54 and an output indicator section 56. More specifically, the power supply section 40 nominally includes input power lines L1 and L2, diodes 60 and 61, resistors 62 and 64, capacitor 66 and zener diode 68. The diode 60, resistor 62 and capacitor 66 are connected in series between the input lines L1 and L2. The diode 60 rectifies the alternating current to direct current and the capacitor 66 filters the rectified voltage wave. Resistors 62 and 64 are used for voltage dropping purposes and the zener diode 68 regulates the output of the power supply section 42 to hold it at a constant voltage. In one embodiment, the reverse bias voltage drop of the zener diode 68, and thus the output of the power supply section 40, is 15 volts. The input line L2 also acts as a negative direct current return. The diode 61 is used to rectify the AC input voltage to supply power to the output indicator section 56.

The regulated DC voltage across zener diode 68 is connected to the voltage reference section 42. Resistors 70 and 72 and zener diode 74 are connected in series across the positive and negative inputs of the voltage reference section 42. With the voltage of zener diode 68 being 15 volts, the voltage of zener diode 64 is nominally set at 6.4 volts. Resistors 76, 78 and 80 are connected in series across the zener diode 74 to act as a voltage dividing circuit. The resistor 76 is a variable trimming resistor and is used to drop the 6.4 volts across the zener diode 74 to a highly accurate 5.00 volts. Close tolerance resistors may be used for 78 and 80. This reference voltage of 5.00 volts appears between junction J1 which is the connection point of the resistor 78 and the resistor 76, and the DC return 12. Junction J1 is connected to the positive input of an operational amplifier 82. Another voltage divider network, including resistors 84 and 86, is connected across the combination of zener diode 74 and resistor 72. The junction of resistors 84 and 86 is connected to the negative input of operational amplifier 82. Amplifier 82 receives power from the positive and negative 15 volt supply of power supply section 40. The output of amplifier 82 is connected through a capacitor 88 to the DC return L2 and also to junction J2. The biasing of amplifier 82 is determined to cause the output voltage appearing at junction J2 to equal twice the input voltage or 10 volts. The 5.00 volts of J1 and the 10.00 volts of J2 are used as reference voltages for the operation of the remainder of the circuits. Resistors 84 and 86 are selected for close tolerance to insure the accuracy of the 10.00 volts.

The resistors 78 and 80 connected between J1 and the DC return L2 act as a voltage divier for that reference voltage, and their junction is connected to the positive input of another operational amplifier 90. A resistor 92 is connected between the output of amplifier 90 and its negative input, and a resistor 94 is connected between negative input of amplifier 90 and the positive 15 volt supply of power supply section 40. A capacitor 96 connects the output of operational amplifier 90 to the negative DC return L2, and a resistor 98 connects the outputs of amplifier 90 to the positive 15 volt supply of power supply section 40. The output of amplifier 90 is adapted to be connected through a resistor 100 to the emitter of a transistor temperature probe 102. The base and collector terminal of transistor temperature probe 102 are connected by a resistor 104. The collector of transistor probe 102 is then connected as the output of the probe section 44. The voltage divider network of resistors 78 and 80 and the amplifier 90 are used to bias the transistor probe 102 in an operating range in which the current carrying characteristics of the probe as connected vary linearly with the changes in temperature of the probe.

As mentioned, the 10 volt supply of junction J2 is used as a reference voltage for various parts of the circuit. A potentiometer 104 is connected across the 10 volt supply of junction J2 via its fixed terminals. A resistor 106 is connected in series with the wiper terminal of potentiometer 104 and forms a variable reference current generating circuit. The potentiometer may be varied to thereby vary the current outputted through resistor 106 as a means of determining a set point temperature against which the temperature of the probe is compared by comparing the current flowing through the resistor 106 and the current flowing through the probe 102. The 10 volt supply of junction J2 is also used to generate a fixed reference current by the connection of a resistor 108 to the junction J2. Resistors 106 and 108 are selected for high accuracy to insure the accuracy of the reference currents.

At this point, the variable reference current from resistor 106, the fixed reference current from resistor 108 and the current from the probe 102 are all connected to a current summation junction J3. An operational amplifier 10 is also connected to junction J3 by its negative input to act as a current to voltage converter. The positive input of amplifier 110 is connected through a resistor 112 to the 5.00 volt supply of junction J1. A pair of resistors 114 and 116 are connected in series between the output of operational amplifier 110 and the current summation junction J3. Resistor 116 is selected for high accuracy. The junction of resistors 114 and 116 or J4 is used as the output of the current to voltage converter and is connected to the positive 15 volt supply of power supply section 40 through a resistor 118. A pair of capacitors 120 and 122 are connected between either end of the resistor 114 and the negative DC return L2.

The voltage divider section 52 comprises five resistors 124 through 128 connected in series between the negative DC return L2 and the 5.00 volt reference of J1. The resistors 124 through 128 are of equal value and outputs are formed at the positive voltage side of each resistor thus forming five voltage outputs of 5 volts, 4 volts, 3 volts, 2 volts and 1 volt, respectively. The five voltage outputs of voltage divider section 52 are each connected to a negative input of operational amplifiers 130 through 134. The positive inputs of amplifiers 130 through 134 are connected in common to output terminals J4 of the current to voltage converter section 50. The amplifiers 130 through 134 are powered from the negative DC return L2 and the plus 15 volt supply of power supply section 40.

The outputs of the voltage comparators 130 through 134 are connected to the output indicator section 56. As mentioned, the output indicator section 56 is powered through diode 61 from the power supply section 40. Five resistors 135 through 139 are connected between the diode 61 and the outputs of comparators 130 through 134. Five light emitting diodes 140 through 144 are connected between the outputs of the voltage comparators 130 through 134, respectively, and the negative DC return L2. In this manner, the light emitting diodes may be energized by their respective voltage comparators 130-134. Light emitting diode 140 which is connected to the output of comparator 130 and resistor 135 represents the set point temperature indicator. A pair of resistors 146 and 148 are connected in series from the output of comparator 130 to the negative DC return L2. A transistor 150 has its emitter connected to the negative DC return L2 and its base connected to the junction of resistors 146 and 148. The collector of transistor 150 is connected to the voltage input from diode 61 by a resistor 154. A light emitting diode 152 is connected across the emitter collector junction of transistor 150. While the circuit indicates that the temperature is below the set point temperature, the light emitting diode 152 is illuminated. Such may be used to indicate a cooking operation for a microwave oven.

The circuit of FIG. 2 operates in a manner very similar to the system depicted by the block diagram of FIG. 1. The power supply section 40 and the voltage reference section 42 combine to provide one or more reference voltages used for temperature measurement. The temperature probe 44 is biased to place the current response of the transistor 102 in an operating range in which the current varies in direct proportion to changes in the temperature of the probe. Thusly, the response of the probe is linear with respect to temperature allowing easier use of the probe by eliminating the need for the compensation circuitry necessary for non-linear probes such as thermistors. The reference voltages from the voltage reference circuit means 42 are used to generate a constant reference current through the resistor 108 and a variable reference current through the potentiometer 104 and resistor 106. The currents from the fixed reference current circuit means 46, the variable reference current circuit means 48 and the temperature probe 44 are summed by the current summation junction J3. The results of this summation are connected to an operational amplifier 110 for conversion into a voltage signal which is indicative of the relationship between the probe current $I_p$ and the set point reference current $I_{SP}$ and thus indicative of the relationship between the probe temperature and the set point temperature. The output of the current to voltage converter 50 is compared by the voltage comparators 130 through 134 against the reference voltages determined by voltage dividers of circuit means 52 to provide a plurality of signals indicative of the relationship between the probe temperature and the set point temperature. The voltage dividers create reference voltages which have equal intervals therebetween corresponding to equal temperature intervals. Thusly, as the probe temperature approaches the set point temperature, the output of the current to voltage converter 50 passes the reference voltages from circuit means 52 in a sequential manner. The voltage comparators 130 through 134 are thereby triggered sequentially causing a visual display via the LEDS 140 through 144 of the temperature interval remaining between the probe temperature and the set point temperature. The equal intervals of the voltage divider circuit means 52 correspond to equal temperature intervals for the indicators 140 through 144. In one embodiment, each of the temperature intervals is 10° F. As the probe temperature reaches 40° below the set point temperature, the light emitting diode 144 is turned on. Likewise, as the probe temperature reaches 30°, 20° and 10° below the set point temperature, the light emitting diodes 143, 142 and 141, respectively, are energized to give the operator a visual display of the heating process. When the probe temperature reaches the set point temperature, the light emitting diode 140 is illuminated.

During the heating process, the light emitting diode 152 remains lit, and as the probe temperature reaches the set point temperature, the light emitting diode 152 is extinguished.

It should be noted, that the circuit of the present invention allows the use of a linearly variable potentiometer 104 as opposed to an exponentially variable component. This feature allows use of a linear temperature selection scale with the wiper of the potentiometer in selecting a set point temperature. This both increases the useable range of temperatures selectable by the potentiometer and allows for greater accuracy in the selection of a set point temperature as equal temperature intervals on the temperature selection scale are evenly spaced regardless of whether they are at the top of the selection range or at the bottom of the selection range. This feature allows the unit to be more easily operated, such as in the case of consumer product applications. This feature also reduces the possibility of error when the unit is operated by persons having limited knowledge of the apparatus.

Figure 3:
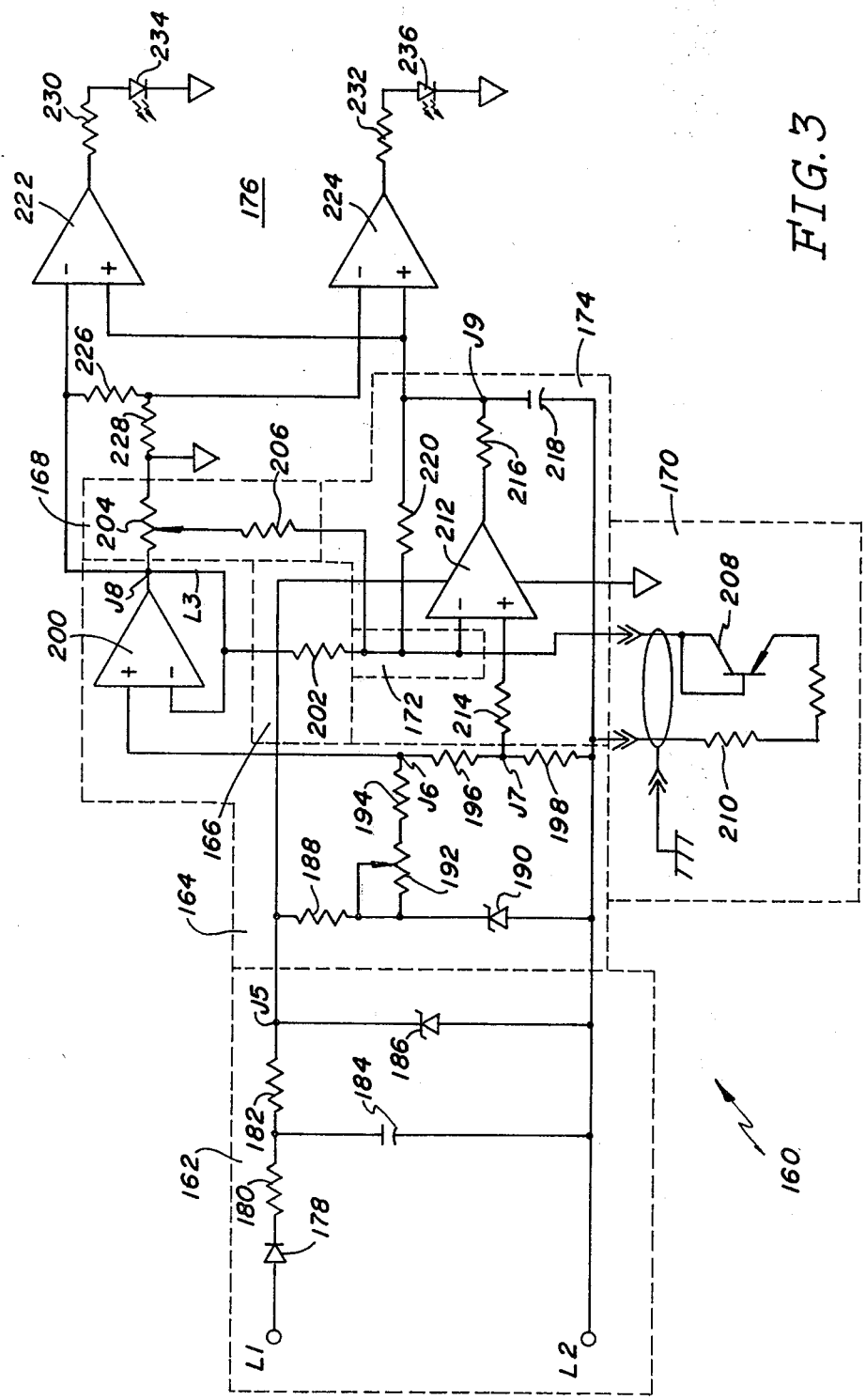
FIG. 3 is another schematic diagram of a circuit constructed according to another embodiment of the present invention and also in accordance with the block diagram of FIG. 1.

FIG. 3 shows a schematic diagram for a temperature sensing circuit 160 constructed according to another embodiment of the present invention. The circuit 160 generally includes a power supply section 162, a voltage reference section 164, a constant reference current section 166, a variable reference current section 168, a temperature probe section 170, a current summation junction 172, a current to voltage converter 174, and an output section 176. Components of FIG. 3 bearing the same reference numerals as components of FIG. 2 are of the same kind or perform the same function as described for the components of FIG. 2.

More specifically, the power supply section 162 nominally includes input lines L1 and L2 for supplying normally available 110 VAC to the circuit 160. The power supply section 162 also includes diode 178, resistors 180 and 182, capacitor 184 and zener diode 186. The diode 178 rectifies the input voltage which is then reduced by resistors 180 and 182 and filtered by capacitor 184. Zener diode 186 has a reversed bias operating voltage of 13 volts plus or minus 10% and serves to regulate the output voltage of the power supply section 162. The output of the power supply section 162 is available between the junction J5 which is the positive DC potential and the line L2 which serves as the DC return.

The voltage reference section 164 includes a resistor 188 and a zener diode 190 connected in series and across the DC supply voltage from J5 to L2. In one embodiment, the zener diode 190 has a reverse bias voltage of 6.4 volts plus or minus 5%. A variable trimming resistor 192 is connected to the junction between the resistor 188 and the cathode of zener diode 190. A series of resistors 194, 196 and 198 are connected in series between the resistor 192 and the DC return L2 to act as a voltage divider. In one embodiment, the resistors 194, 196 and 198 are selected with high accuracy to present a highly accurate voltage at J6, the junction between resistors 194 and 196 and another highly accurate voltage at junction J7, the junction between resistors 196 and 198. The voltage at junction J7 is exactly half of that at junction J6. Junction J6 is connected to the positive input of an operational amplifier 200 which includes a direct feedback path L3 from its output to its negative input, thus causing the amplifier 200 to operate with a unity gain. In this manner, the voltage at junction J8, or the output of the amplifier 200, is exactly equal to the voltage at junction J6.

The constant reference current section 166 comprises a resistor 202 connected to the output J8 of amplifier 200. The variable reference current section 168 includes a potentiometer 204 having its fixed end terminals connected to the junction J8 and the DC return L2, and a fixed resistor 206 connected to the variable wiper terminal of the potentiometer 204. The resistors 202 and 206 may have a close tolerance to insure the operating accuracy of the circuit.

The semiconductor junction temperature probe includes a transistor 208 having its collector and base interconnected and its emitter connected to the DC return 12 through a resistor 210.

The current summation junction 172 is shown connected to resistor 202 of the constant reference current section 166, resistor 206 of the variable reference current section 168 and to the temperature probe 170 via line L4, through which the probe current $I_p$ flows. The current to voltage converter 174 includes an operational amplifier 212 which has its negative input connected to current summation junction 172 and its positive input connected to a resistor 214 to reference voltage terminal J7. The operational amplifier 212 is powered on one side from the DC voltage of J5 and on the other by the DC return L2. A resistor 216 and capacitor 218 are connected in series from the output of amplifier 212 to the DC return L2. The output of the current to voltage converter is obtained at junction J9 which is the connection between the resistor 216 and the capacitor 218. An additional resistor 220 connects the junction J9 to the negative input of amplifier 212 as a feedback path. The resistor 220 is selected for high accuracy.

The output section 176 includes operational amplifier 222 and 224. The positive input of the amplifiers 222 and 224 are interconnected and connected to the output at junction J9 of the current to voltage converter. The output section 176 also includes a voltage divider comprising two resistors 226 and 228 which are connected from the reference voltage terminal J8 to the DC return L2. The negative input of amplifier 222 is connected to the voltage reference terminal J8 and the negative input terminal of amplifier 224 is connected to the interconnection between resistors 226 and 228. A resistor 230, 232 and a light emitting diode 234, 236 are connected in series from the outputs of each of the amplifiers 224 to the DC return as a means of providing an indication signal.

It is easily recognized that the circuit of FIG. 3 is less complex than the circuit of FIG. 2. Even so, the circuit of FIG. 3 performs in essentially the same manner and includes essentially the same features as FIG. 2. The potentiometer 204 is the same type of linearly variable potentiometer as 104 of FIG. 2. Thus, the same type of linear temperature scale may be used in cooperation with the variable wiper. It should be noted that FIG. 3 only includes a pair of voltage comparators 222 and 224 and not the five of FIG. 2. These operate in the same manner as the set point temperature comparator 140 and one of the other comparators of FIG. 2.

Figure 4:
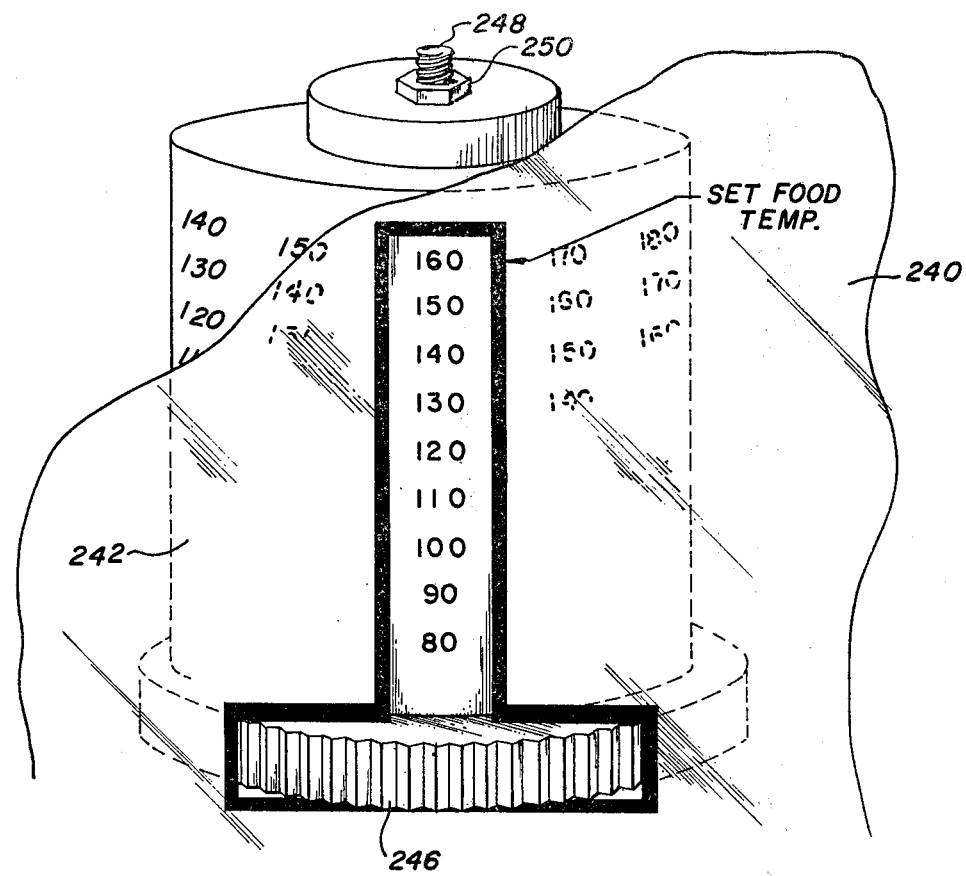
FIG. 4 is a perspective view of a set point temperature selection dial capable of being used with the embodiments of either FIG. 2 or FIG. 3.

FIG. 4 is a front perspective view of a means for inputting a set point temperature selection. FIG. 4 shows a portion of a display panel 240 and a temperature display drum 242, a portion of which extends through an opening 244 in the display panel 240. The temperature selection drum includes a plurality of columns of selectable cooking temperatures. Each column is graded in 10° intervals from the highest temperature which appears at the top to the lowest temperature which appears at the bottom of each column. Each column represents a different set point temperature so that the set point temperature may be selected by rotating a thumb wheel 246 attached to the bottom of the drum 242 to cause the desired set point temperature to appear at the top of the opening 244. The numbers which simultaneously appear below the selected set point temperature correspond to the temperature intervals determined for each of the comparators 130 through 134 of FIG. 2. By mounting the light emitting diodes 149 through 144 inside the set point temperature selection drum 242 and behind the opening 244, the energization of each light can be used to directly indicate the cooking temperature which has been reached at the temperature probe 44. Thus, as food is being heated in a microwave oven, the set point temperature selection dial lights up starting with the low temperature and proceeding to the set point temperature in the same manner as indicated for the light emitting diodes 140 through 144 of FIG. 2. This mechanism thereby integrates the function of the set point temperature selection and the probe temperature display indicators. The potentiometer 104 may be mechanically connected to the set point temperature selection drum 242 by any suitable means. One example would be to mount the potentiometer inside the drum 242 and just below the shaft 248 and not 250. It should be noted that the temperature selection drum 242 includes more temperature interval indicators than there are comparators in FIGS. 1, 2 or 3. This is to indicate that the intervals selected may be any number. FIG. 4 also illustrates the linearity of the temperature scale as the various selectable set point temperatures are evenly spaced along angular rotational intervals of the drum. In the event that a set point temperature is desired which is between the 10° temperatures shown, the position of the drum may be estimated between the appropriated bracketing 10° temperatures or additional scale markings in between columns may be included to aid positioning of the drum 242. In such circumstances, the present invention would continue to operate in the proper manner. The various indicators would still show a probe temperature to be at the various temperature intervals below the set point temperature.

It should be kept in mind that the embodiments described above are intended to be taken in an illustrative and not a limiting sense and that various modifications and changes may be made to these embodiments by persons skilled in the art while still remaining within the scope of the appended claims.

What is claimed is:

1. A temperature sensing circuit for a semiconductor junction temperature probe, comprising:

means for biasing said probe for causing the current flowing through said probe to be proportional to the temperature of said probe;

means for providing a selectively variable reference current representing a selectively variable set point temperature, said reference current being linearly variable with respect to selectable set point temperatures, said means for providing including a constant reference current source and a variable reference current source;

a current summation junction means for coupling said probe and said means for providing said reference current and for summing said reference current and the current flowing through said probe; and means coupled to said junction means for producing an output signal in response to the summation of said reference current and the current flowing through said probe to indicate the relationship between said set point temperature and the temperature of said probe, said means for producing an output signal including a current to voltage converter having an input coupled to said current summation junction, said current to voltage converter including an operational amplifier having first and second inputs and an output, a feedback path for said operational amplifier, and means for providing a constant reference voltage to said amplifier first input, said amplifier second input being coupled to said current summation junction, said feedback path being coupled between said amplifier output and said amplifier second input.

2. A temperature sensing circuit for a semiconductor junction temperature probe, comprising:

means for biasing said probe for causing the current flowing through said probe to be proportional to the temperature of said probe;

means for providing a selectively variable reference current representing a selectively variable set point temperature, said reference current being linearly variable with respect to selectable set point temperatures, said means for providing including a constant reference current source and a variable reference current source;

a current summation junction means for coupling said probe and said means for providing said reference current and for summing said reference current and the current flowing through said probe;

means coupled to said junction means for producing an output signal in response to the summation of said reference current and the current flowing through said probe to indicate the relationship between said set point temperature and the temperature of said probe, said means for producing an output signal including a current to voltage converter having an input coupled to said current summation junction; and a voltage comparator means and a constant reference voltage source, said comparator means having a first input connected to said constant reference voltage source and a second input electrically coupled to said converter wherein the voltage at said comparator second input equals the voltage at said comparator first input when the temperature sensed by said probe equals said set point temperature represented by said variable reference current.

3. The sensing circuit of claim 2, wherein said voltage comparator means has an output which changes voltage polarity when the voltages at said first and second inputs thereof are equal, said circuit further comprising an indicator means connected to said comparator means output and being responsive to the change of polarity thereof.

* * * * *